United States Patent
Herr et al.

(10) Patent No.: US 10,612,517 B2
(45) Date of Patent: Apr. 7, 2020

(54) FLEXIBLE EXTENSION FOR WIND TURBINE ROTOR BLADES

(71) Applicant: General Electric Company, Schenectady, NY (US)

(72) Inventors: Stefan Herr, Greenville, SC (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 275 days.

(21) Appl. No.: 15/454,120

(22) Filed: Mar. 9, 2017

(65) Prior Publication Data

US 2018/0258912 A1    Sep. 13, 2018

(51) Int. Cl.
*F03D 7/02* (2006.01)
*F03D 1/06* (2006.01)

(52) U.S. Cl.
CPC ......... *F03D 7/0232* (2013.01); *F03D 1/0633* (2013.01); *F03D 1/0675* (2013.01); *F05B 2230/31* (2013.01); *F05B 2240/221* (2013.01); *F05B 2240/311* (2013.01); *F05B 2270/402* (2013.01); *F05B 2280/6013* (2013.01); *Y02E 10/721* (2013.01); *Y02E 10/723* (2013.01)

(58) Field of Classification Search
CPC ........ F03D 1/06; F03D 1/0641; F03D 1/0658; F03D 1/0683; F03D 7/02; F03D 7/0228; F03D 7/0232; F03D 80/80; F05B 2230/31; F05B 2240/221; F05B 2240/311; F05B 2280/6013
USPC ................................................. 416/23, 146 R
See application file for complete search history.

(56) References Cited

U.S. PATENT DOCUMENTS

| 7,976,283 B2 * | 7/2011 | Huck ................... F03D 1/0633 415/119 |
| 8,480,371 B2 | 7/2013 | Esaki |
| 8,834,127 B2 | 9/2014 | Giguere et al. |
| 2007/0065290 A1 * | 3/2007 | Herr ...................... F03D 1/0633 416/223 R |
| 2008/0080977 A1 * | 4/2008 | Bonnet ................... F03D 3/061 416/229 A |

(Continued)

FOREIGN PATENT DOCUMENTS

| JP | 2011-137391 A | 7/2011 |
| KR | 10-1331961 B1 | 11/2013 |
| WO | WO2015/176868 A1 | 11/2015 |

OTHER PUBLICATIONS

PCT Search Report and Written Opinion, dated Jan. 25, 2019.

*Primary Examiner* — John Kwon
*Assistant Examiner* — Johnny H Hoang
(74) *Attorney, Agent, or Firm* — Dority & Manning, P.A.

(57) ABSTRACT

The present disclosure is directed to a rotor blade assembly for a wind turbine. The rotor blade assembly includes a rotor blade having surfaces defining a pressure side, a suction side, a leading edge, and a trailing edge extending between a blade tip and a blade root. Further, the rotor blade assembly includes a flexible extension having a first end and a second end. More specifically, the first end is mounted to a surface of the rotor blade and the second end is free. As such, during operation of the wind turbine, the flexible extension passively adjusts with a changing angle of attack of the rotor blade, thereby reducing variations in blade loading.

14 Claims, 7 Drawing Sheets

(56) References Cited

U.S. PATENT DOCUMENTS

| | | | |
|---|---|---|---|
| 2008/0166241 A1* | 7/2008 | Herr | F03D 1/065 |
| | | | 416/241 R |
| 2009/0028705 A1* | 1/2009 | Meldgaard | F03D 1/0675 |
| | | | 416/23 |
| 2009/0074585 A1* | 3/2009 | Koegler | F03D 1/0675 |
| | | | 416/228 |
| 2009/0104038 A1* | 4/2009 | Grabau | F03D 1/0641 |
| | | | 416/219 R |
| 2011/0142635 A1* | 6/2011 | Fritz | F03D 1/0675 |
| | | | 416/62 |
| 2012/0134837 A1* | 5/2012 | Drobietz | F03D 1/0633 |
| | | | 416/228 |
| 2012/0189455 A1 | 7/2012 | Enevoldsen et al. | |
| 2012/0269644 A1* | 10/2012 | Enevoldsen | F03D 1/065 |
| | | | 416/235 |
| 2013/0266441 A1* | 10/2013 | Enevoldsen | F03D 7/0204 |
| | | | 416/23 |
| 2014/0072441 A1 | 3/2014 | Asheim et al. | |
| 2015/0233345 A1* | 8/2015 | Olsen | F03D 1/0633 |
| | | | 416/146 R |
| 2016/0312763 A1 | 10/2016 | Arce et al. | |
| 2016/0369775 A1* | 12/2016 | Gonzalez | F03D 1/0641 |
| 2017/0051718 A1 | 2/2017 | Klitgaard et al. | |

* cited by examiner

FLEXIBLE EXTENSION FOR WIND TURBINE ROTOR BLADES

FIELD OF THE INVENTION

The present disclosure relates in general to wind turbine, and more particularly to flexible extensions or stabilizers connected to wind turbine rotor blades for reducing load variations of the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The lift force is generated when the flow from the leading edge to the trailing edge creates a pressure difference between the top and bottom surfaces of the rotor blade. Ideally, the lift force is constant in time to provide the optimal amount of kinetic energy to transmit to the generator. However, as the wind inflow varies in space and time, the rotor blade is subjected to variable inflow conditions and generates variable lift forces resulting in a variation of the blade loading.

The specific lift force depends on a number of factors, such as incoming air flow characteristics (e.g. Reynolds number, wind speed, in-flow atmospheric turbulence) and characteristics of the rotor blade (e.g. airfoil sections, blade chord and thickness, twist distribution, pitch angle, etc.), all resulting in a local angle of attack for the rotor blade that results in a specific lift force.

The variation in the angle of attack during operation of the wind turbine can lead to strongly varying loads acting on the rotor blades as well as the drivetrain components. As such, some wind turbines implement pitching of the rotor blades to mitigate such load variations.

Even still, the art is continuously seeking new and improved systems and methods for reducing such variations in the angle of attack during operation so as to reduce corresponding variations in blade loading. Thus, the present disclosure is directed to a flexible extension connected to wind turbine rotor blades that passively adjusts the airfoil shape of the rotor blade in response to the changing angle of attack.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade assembly for a wind turbine. The rotor blade assembly includes a rotor blade having surfaces defining a pressure side, a suction side, a leading edge, and a trailing edge extending between a blade tip and a blade root. Further, the rotor blade assembly includes a flexible extension having a first end and a second end. More specifically, the first end is mounted to a surface of the rotor blade, whereas the second end is free. As such, during operation of the wind turbine, the flexible extension passively adjusts or moves with a changing angle of attack of the rotor blade, thereby reducing variations in blade loading.

In one embodiment, the flexible extension may include an extension plate. In additional embodiments, the extension plate may include one or more openings configured to increase flexibility thereof.

In another embodiment, the extension may include a gurney flap extending from the extension plate at the second end. In further embodiments, the extension may include one or more gurney wings extending from the extension plate. For example, in certain embodiments, the one or more gurney wings may extend generally perpendicular to the extension plate. In additional embodiments, the gurney wing(s) may be centrally supported by a support member secured to the extension plate. In such embodiments, the gurney wing(s) are configured to flex towards each other with the changing angle of attack of the rotor blade.

In additional embodiments, the rotor blade assembly may include a bond layer disposed between the first end of the extension and the surface of the rotor blade. As such, the bond layer bonds the first end of the extension to the rotor blade. In such embodiments, the bond layer may include a weld, an epoxy, a polyurethane, a methacrylate, an acrylic, an inner acrylic foam layer disposed between opposing outer adhesive layers, or any other suitable bond layers.

In further embodiments, the flexible extension may be constructed of any suitable materials, such as a thermoplastic material or a thermoset material. In addition, the flexible extension may be reinforced with a fiber material. For example, in such embodiments, the fiber material may include glass fibers, carbon fibers, polymer fibers, ceramic fibers, nanofibers, wood fibers, bamboo fibers, metal fibers, or similar.

In still another embodiment, the flexible extension may be formed via any suitable manufacturing process, including but not limited to injection molding, three-dimensional (3-D) printing, two-dimensional (2-D) pultrusion, 3-D pultrusion, thermoforming, vacuum forming, pressure forming, bladder forming, automated fiber deposition, automated fiber tape deposition, or vacuum infusion.

In certain embodiments, the rotor blade assembly may further include a plurality of flexible extensions mounted to the rotor blade.

In another aspect, the present disclosure is directed to a method for reducing variations in loading of a rotor blade of a wind turbine. The method includes mounting a first end of a flexible extension to a surface of the rotor blade with a second end of the flexible extension remaining free. Further, the method includes passively adjusting, via the flexible extension, a chord-wise airfoil shape of the rotor blade in response to a changing angle of attack of the rotor blade during operation of the wind turbine.

In one embodiment, the method may further include modifying a flexibility of the flexible extension as a function of at least one of a span location along the rotor blade or an aerodynamic characteristic. It should be understood that the method may further include any of the additional steps and/or features described herein.

In yet another aspect, the present disclosure is directed to a wind turbine. The wind turbine includes a tower extending from a support surface, a nacelle mounted atop the tower, and a rotor having a rotatable hub with a plurality of rotor blades mounted thereto. Further, each of the rotor blades has surfaces defining a pressure side, a suction side, a leading edge, and a trailing edge extending between a tip and a root. The wind turbine also includes at least one flexible extension having a first end and a second end. More specifically, the first end of the flexible extension is mounted to one of the surfaces of the rotor blade, whereas the second end is free. As such, during operation of the wind turbine, the extension flexes with a changing angle of attack of the rotor blade, thereby reducing variations in blade loading. It should be understood that the wind turbine may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
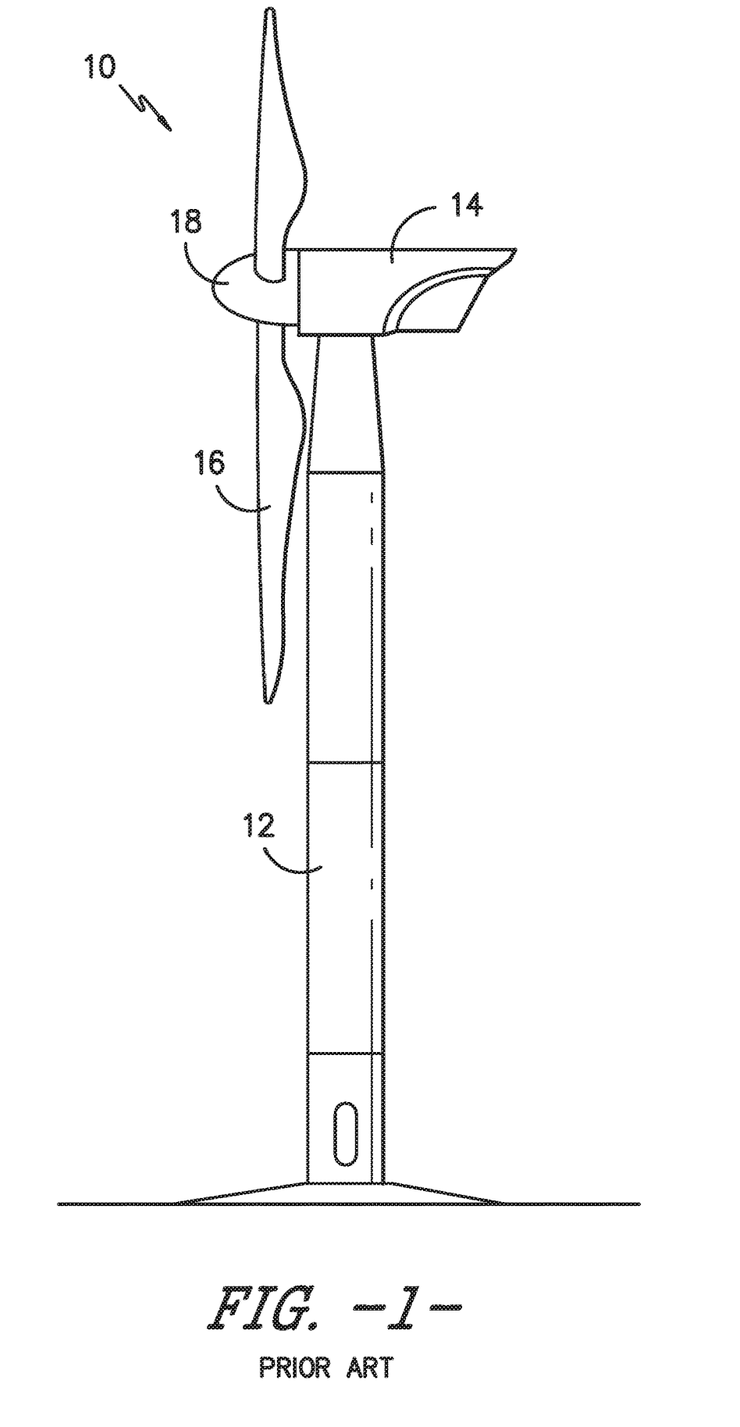
FIG. 1 illustrates a perspective view of a wind turbine according to conventional construction.

Referring now to the drawings, FIG. 1 illustrates a perspective view of a wind turbine 10 according to conventional construction. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14 (not shown). The view of FIG. 1 is provided for illustrative purposes only to place the present invention in an exemplary field of use. It should be appreciated that the invention is not limited to any particular type of wind turbine configuration.

Figure 2:
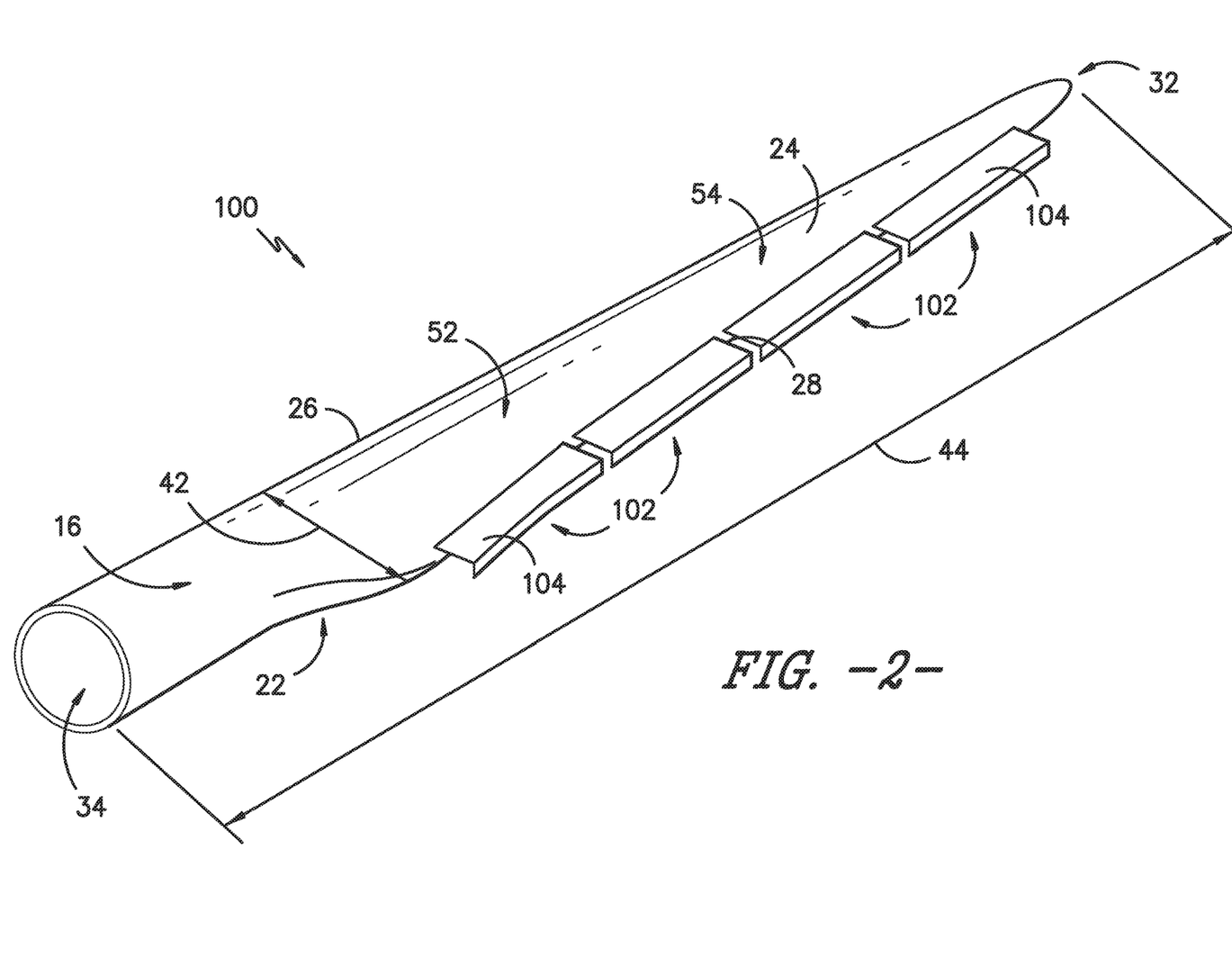
FIG. 2 illustrates a perspective view of one embodiment of a rotor blade assembly according to the present disclosure.
Figure 3:
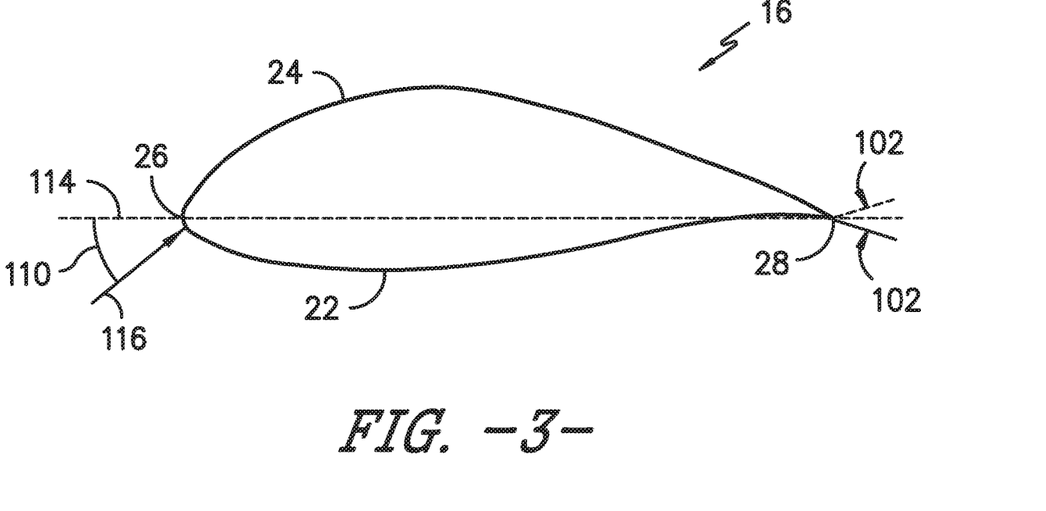
FIG. 3 illustrates a cross-sectional view of one embodiment of a rotor blade assembly according to the present disclosure.
Figure 4:
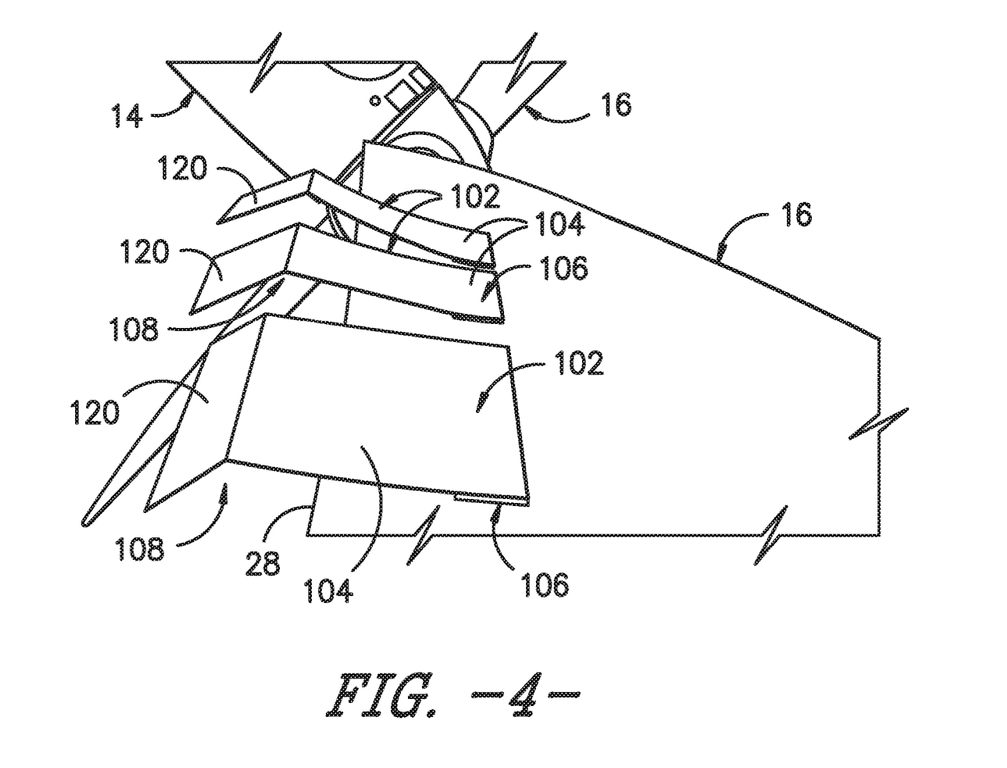
FIG. 4 illustrates a partial, perspective view of one embodiment of a rotor blade assembly according to the present disclosure, particularly illustrating a plurality of flexible extensions mounted to the rotor blade.

Referring now to FIG. 2, a perspective view of a rotor blade 16 according to the present disclosure is illustrated. As shown, the rotor blade 16 may include exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIG. 2, the chord 42 may vary throughout the span 44 of the rotor blade 16. Thus, a local chord may be defined for the rotor blade 16 at any point on the rotor blade 16 along the span 44.

Additionally, the rotor blade 16 may define an inner board area 52 and an outer board area 54. The inner board area 52 may be a span-wise portion of the rotor blade 16 extending from the root 34. For example, the inner board area 52 may, in some embodiments, include approximately 33%, 40%, 50%, 60%, 67%, or any percentage or range of percentages therebetween, or any other suitable percentage or range of percentages, of the span 44 from the root 34. The outer board area 54 may be a span-wise portion of the rotor blade 16 extending from the tip 32, and may in some embodiments include the remaining portion of the rotor blade 16 between the inner board area 52 and the tip 32. Additionally or alternatively, the outer board area 54 may, in some embodiments, include approximately 33%, 40%, 50%, 60%, 67%, or any percentage or range of percentages therebetween, or any other suitable percentage or range of percentages, of the span 44 from the tip 32.

As illustrated in FIGS. 2-9, the present disclosure may further be directed to a rotor blade assembly 100, which includes the rotor blade 16 and one or more flexible extensions 102 mounted thereto. Further, as shown, each of the flexible extensions 102 has a first end 106 and a second end 108. More specifically, the first end 106 is mounted to a surface of the rotor blade 16, whereas the second end 108 remains free. As such, during operation of the wind turbine 10, the free second end 108 passively adjusts with a changing angle of attack of the rotor blade 16, thereby reducing variations in blade loading. As used herein, the term "passively" and similar generally refers to being influenced, acted upon, or affected by some external force. Further, it should be understood that the external force(s) can have aerodynamic, gravitational, and/or centrifugal sources, and may be predominately aerodynamically driven. Thus, a passive article (i.e. the flexible extension) is the object of action rather than the object causing the action. Further, as used herein and illustrated in FIG. 3, the angle of attack 110 generally refers to the angle between a chord line 114 of the rotor blade 16 and a blade inflow direction 116. Thus, the angle of attack 110 constantly changes with the blade inflow direction 116 during operation of the wind turbine 10. As such, the flexible extension(s) 102 as described herein may passively move up and down as indicated by the dotted extension 102 with the changing angle of attack 110.

Thus, the extension(s) 102 described herein is constructed of materials that allow it to flex with a changing angle of attack 110 of the rotor blade 16, thereby reducing variations in blade loading. For example, in certain embodiments, the extension(s) 102 may be constructed of a thermoplastic material or a thermoset material. As such, the flexible or aeroelastic extension 102 is configured to tailor the airfoil shape of the rotor blade 16 in response to the changing angle of attack 110.

The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, the extension(s) 102 may be optionally reinforced with a fiber material. For example, in such embodiments, the fiber material may include glass fibers, carbon fibers, polymer fibers, ceramic fibers, nanofibers, wood fibers, bamboo fibers, metal fibers, or similar or combinations thereof. In addition, the direction of the fibers may include multi-axial, unidirectional, biaxial, triaxial, or any other another suitable direction and/or combinations thereof. Further, the fiber content may vary depending on various desired properties of the extension 102, such as the stiffness and/or the desired weldability thereof.

As such, the extension(s) 102 may be formed via any suitable manufacturing process, including but not limited to injection molding, three-dimensional (3-D) printing, two-dimensional (2-D) pultrusion, 3-D pultrusion, thermoforming, vacuum forming, pressure forming, bladder forming, automated fiber deposition, automated fiber tape deposition, or vacuum infusion.

Thus, the extension(s) 102 provide a homogenous change to the cross-sectional shape of the airfoil of the rotor blade 16 (FIG. 3), rather than, for example, a step change, over its chord-wise length. As such, the extension(s) 102 do not disrupt the aerodynamic properties of the airfoil. Further, the extension(s) 102 do not have a specific hinge point, which also maintains the aerodynamic properties of the airfoil.

In general, the extensions 102 may be connected to a surface of the rotor blade 16. More specifically, in one embodiment, an extension 102 may be connected to a surface of the rotor blade 16 adjacent the trailing edge 28 thereof. Alternatively, an extension 102 may be connected to a surface of the rotor blade 16 adjacent the leading edge 26 of the rotor blade 16, or adjacent the blade tip 32 or the blade root 34, or at any other suitable position on the rotor blade 16.

In exemplary embodiments, as shown in FIG. 2, the extension(s) 102 may be connected to the suction side 24 of the rotor blade 16. More specifically, in certain embodiments, the free second end 108 of the extension(s) 102 may extend beyond the trailing edge 28 towards the pressure side 22. In alternative embodiments, an extension 102 may be connected to the pressure side 22.

In some embodiments, a rotor blade assembly 100 may include only one extension 102 connected to the rotor blade 16. In other embodiments, as shown in FIGS. 2 and 5-7, the rotor blade assembly 100 may include a plurality of the extensions 102 connected to the rotor blade 16. For example, in some embodiments, a plurality of extensions 102 may be mounted in a generally span-wise array along at least a portion of the span 44 of the rotor blade 16. These extensions 102 may abut one another or be spaced apart from one another in the generally span-wise direction.

In certain embodiments, the first end 106 of the extension(s) 102 may be mounted to the rotor blade 16 using any suitable means. For example, in some embodiments, mechanical fasteners such as nut/bolt combinations, nails, screws, rivets, or other suitable mechanical fasteners may be utilized to mount the extension(s) 102 to the rotor blade 16. In additional embodiments, the first end 106 of the extension(s) 102 may be mounted to the rotor blade 16 using a bond layer 126 disposed between the first end 106 of the extension 102 and the surface (e.g. the suction side 24) of the rotor blade 16. As such, the bond layer 126 bonds the first end 106 of the extension 102 to the rotor blade 16. The bond layer 126 may in general be any suitable adhesive or bonding material. For example, in some embodiments, the bond layer 126 may include a weld, an epoxy, polyurethane, methacrylate such as methyl methacrylate or another suitable methacrylate, or an acrylic. In embodiments wherein the bond layer 126 is an acrylic, the acrylic may be an acrylic foam, such as a closed cell acrylic foam, or any acrylic solid or non-foam.

In other embodiments, the bond layer 126 may include an inner layer and a plurality of outer layers. The inner layer may be disposed between the opposing outer layers. Further, the inner layer may include, for example, an epoxy, a polyurethane, a methacrylate, or an acrylic. In exemplary embodiments, the inner layer may be an acrylic foam. Further, the acrylic foam may be a closed-cell acrylic foam. In addition, the outer layers may generally be configured to mount the extension(s) 102 to the rotor blade 16. In exemplary embodiments, the outer layers may include adhesives and are outer adhesive layers. For example, in some exemplary embodiments, the outer layers may comprise acrylic adhesives. As such, the adhesives are generally disposed on the outer surfaces of the outer layers to adhere to, for example, the extension 102 and/or rotor blade 16. The inner layer may generally be coated to the inner surfaces of the outer layers to form the bond layer 126.

Figure 5:
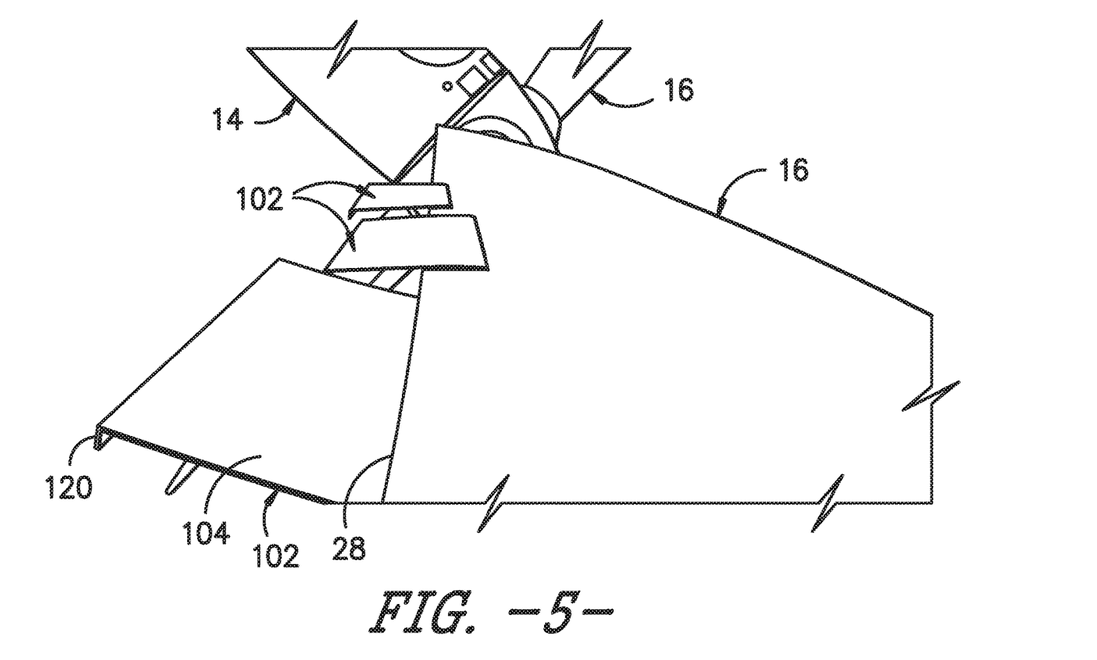
FIG. 5 illustrates a partial, perspective view of another embodiment of a rotor blade assembly according to the present disclosure, particularly illustrating a plurality of flexible extensions having gurney flaps mounted to the rotor blade.
Figure 6:
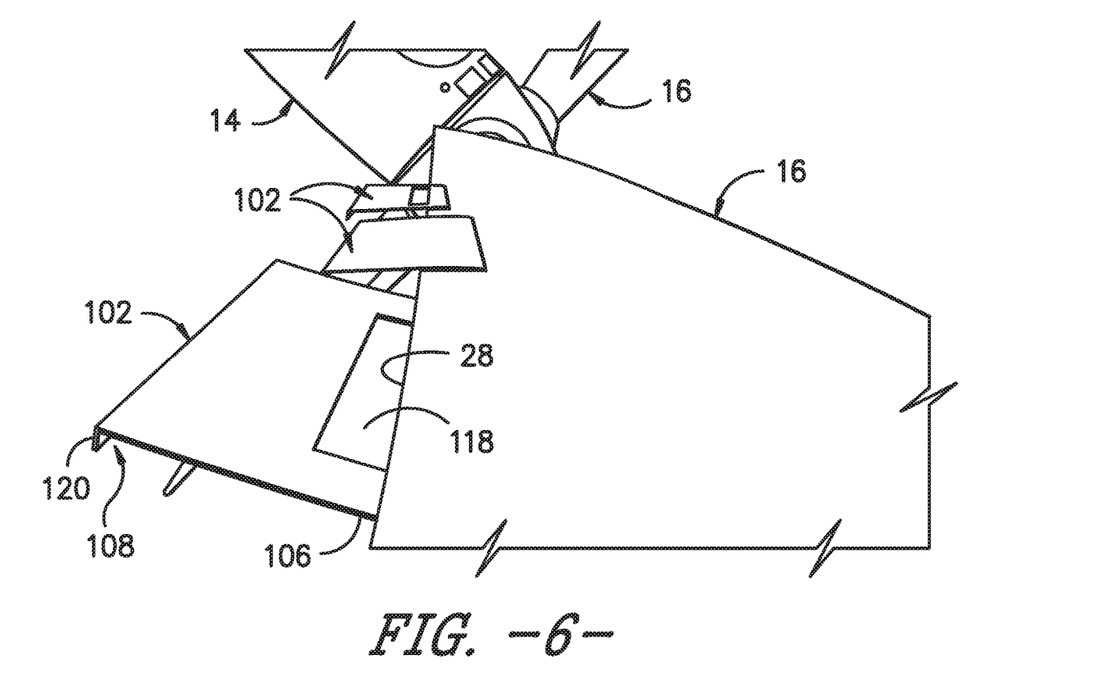
FIG. 6 illustrates a partial, perspective view of still another embodiment of a rotor blade assembly according to the present disclosure, particularly illustrating a plurality of flexible extensions having gurney flaps mounted to the rotor blade.
Figure 7:
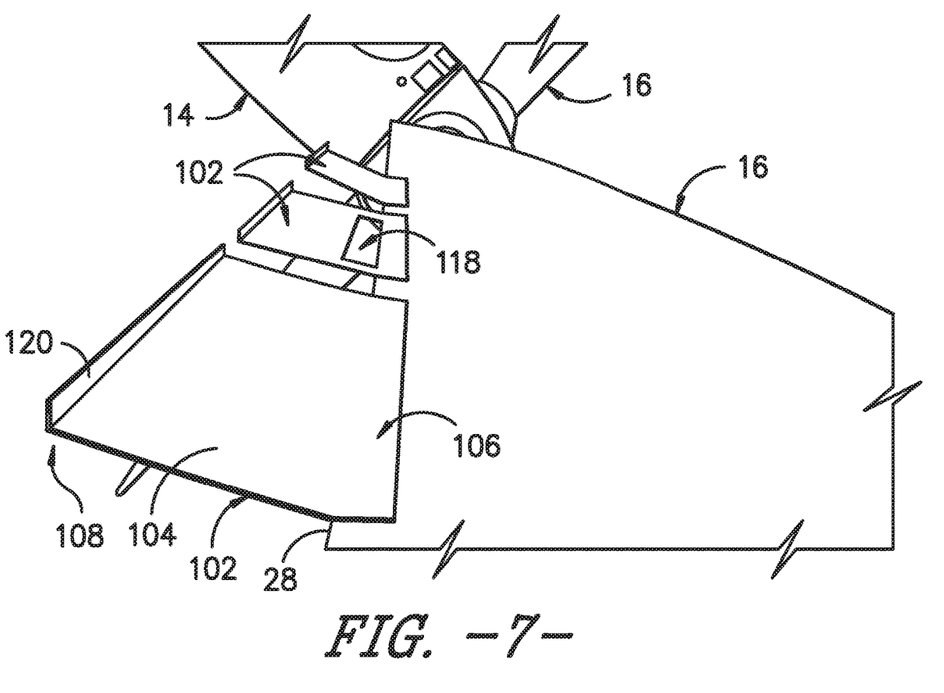
FIG. 7 illustrates a partial, perspective view of yet another embodiment of a rotor blade assembly according to the present disclosure, particularly illustrating a plurality of flexible extensions having gurney flaps mounted to the rotor blade.
Figure 8:
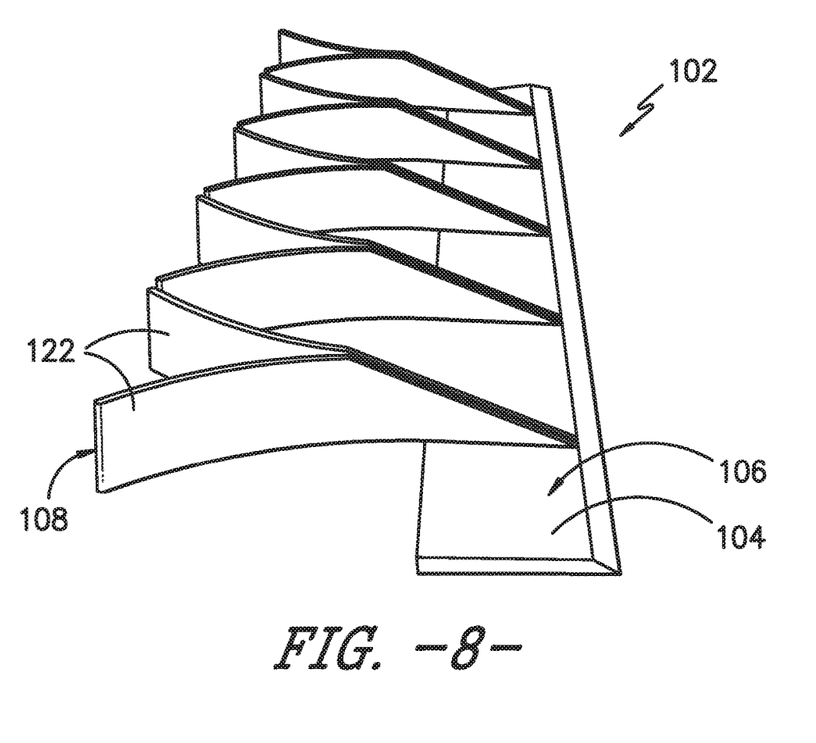
FIG. 8 illustrates a partial, perspective view of another embodiment of a rotor blade assembly according to the present disclosure, particularly illustrating a plurality of flexible extensions having gurney wings mounted to the rotor blade.

Referring to FIGS. 2-7, the extension(s) 102 according to the present disclosure may, in some embodiments, include an extension plate 104. In certain embodiments, as shown in FIGS. 6 and 7, the extension plate 104 may include one or more openings 118 configured to increase flexibility thereof. More specifically, as shown, the opening(s) 118 may be rectangular in shape. Alternatively, the opening(s) 118 may have any suitable shape. In addition, as shown, the opening(s) 118 may be configured to adjacent to the trailing edge 28 of the rotor blade when mounted to the rotor blade 16.

Figure 9:
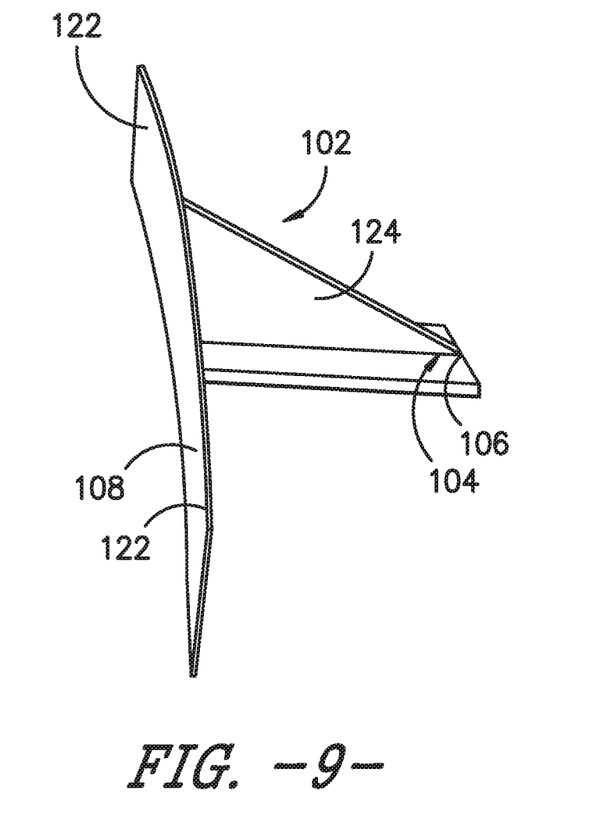
FIG. 9 illustrates a partial, perspective view of another embodiment of a rotor blade assembly according to the present disclosure, particularly illustrating a plurality of flexible extensions having gurney wings mounted to the rotor blade.
Figure 10:
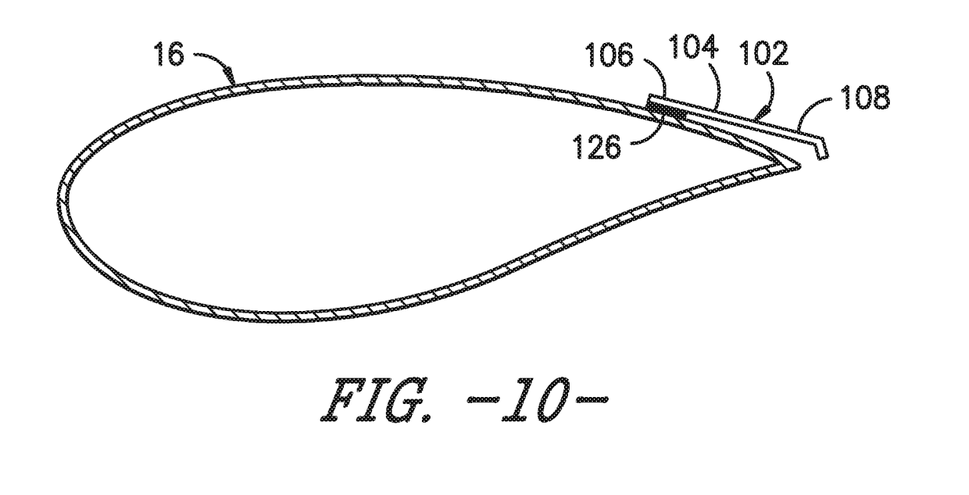
FIG. 10 illustrates a cross-sectional view of one embodiment of a rotor blade assembly according to the present disclosure, particularly illustrating a flexible extension mounted to the rotor blade via a bond layer.

In further embodiments, as shown in FIGS. 4-9, the extension(s) 102 may include a gurney flap 120 (FIGS. 4-7) or one or more gurney wings 122 (FIGS. 8-9) may extend from the extension plate 104. For example, in such embodiments, the gurney flap 120 and/or the gurney wings 122 may extend from the extension plate 104, such as generally perpendicular to the extension plate 104. More specifically, as shown in FIGS. 5-7, the extensions 102 include a generally perpendicular gurney flap 120 extending from the free second end 108 of the extension 102. In addition, as shown, the gurney flaps 120 may extending in a generally downward direction (FIGS. 4-6) or in a generally upward direction (FIG. 7). In further embodiments, as shown in FIG. 9, the gurney wing(s) 122 may be centrally supported by a support member 124 secured to the extension plate 104. In such embodiments, the gurney wings 122 are configured to flex towards each other with the changing angle of attack 110 of the rotor blade 16. Further, in certain embodiments, the entire extension 102 is configured to move with the changing angle of attack 110, and not just the gurney flap 120 and/or gurney wings 122.

In some embodiments, the gurney flap 120 and/or the gurney wing(s) 122 may be connected to the extension 102 using a suitable mechanical fastener, bond layer, or other suitable connecting apparatus. In other embodiments, the gurney flap 120 and/or the gurney wing(s) 122 may be integral with the extension 102, as shown.

It should be understood that the extension(s) 102 described herein may be modified for various blade applications. As such, the stiffness, thickness, material, fiber, fiber content, fiber direction, hole design, shape, mounting location, etc. of the extension(s) 102 may be modified based on such application.

Figure 11:
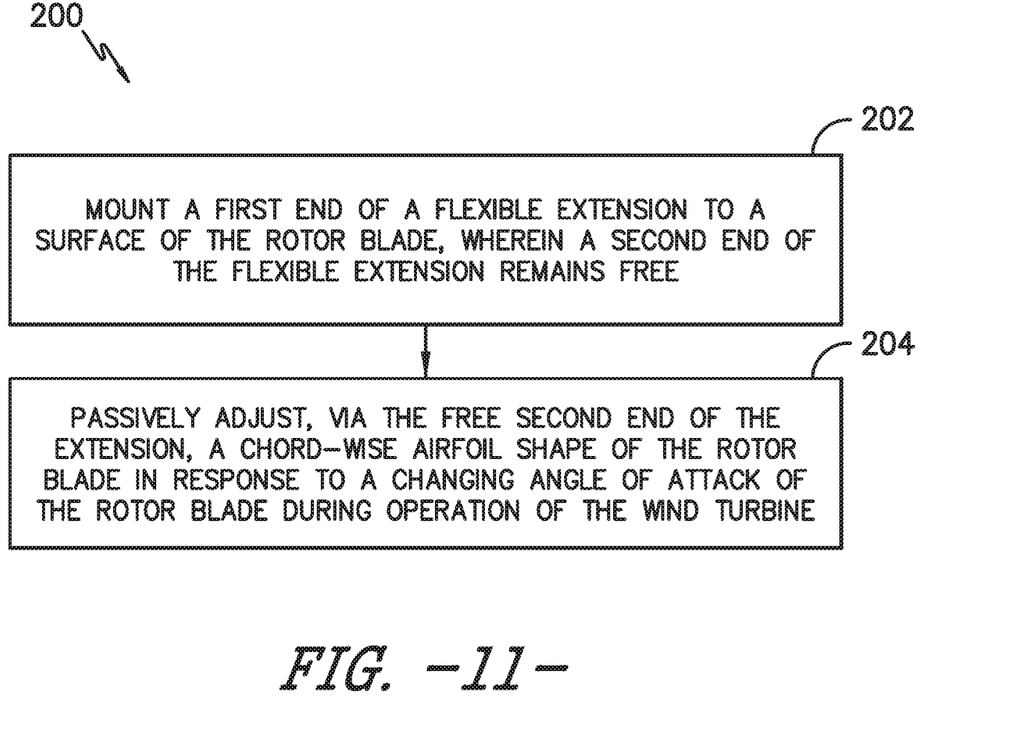
FIG. 11 illustrates a flow diagram of a method for reducing variations in loading of a rotor blade of a wind turbine according to the present disclosure.

Referring now to FIG. 11, a flow diagram of one embodiment of a method 200 for reducing variations in loading of a rotor blade 16 of a wind turbine 10 is illustrated. For example, as shown at 202, the method 200 includes mounting a first end 106 of a flexible extension 102 to a surface of the rotor blade 16 with a second end 108 of the flexible extension 102 remaining free. Further, as shown at 204, the method 200 includes passively adjusting, via the free second end 108 of the extension 102, a chord-wise airfoil shape of the rotor blade 16 in response to a changing angle of attack 110 of the rotor blade 16 during operation of the wind turbine 10. In one embodiment, the method may further include modifying a flexibility of the flexible extension 102 as a function of at least one of a span location along the rotor blade 16 or an aerodynamic characteristic. For example, in certain embodiments, the flexibility and/or shape of the extension(s) 102 can be tuned or changed based on a span location of the extension 102 and/or to tailor performance (e.g. by providing materials with varying stiffness based on an in outboard or inboard location).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
    a rotor blade having surfaces defining a pressure side, a suction side, a leading edge, and a trailing edge extending between a blade tip and a blade root; and,
    a flexible extension plate comprising a first end and a second end, the first end being mounted to a surface of the rotor blade, the second end being free, the flexible extension plate further comprising a gurney flap extending perpendicularly from the extension plate at the second end, wherein, during operation of the wind turbine, the flexible extension plate passively adjusts with a changing angle of attack of the rotor blade such that an airfoil shape of the rotor blade changes with the changing angle of attack, thereby reducing variations in blade loading.

2. The rotor blade assembly of claim 1, wherein the extension plate comprises one or more openings adjacent to the trailing edge of the rotor blade configured to increase flexibility of the mounted extension, wherein the one or more openings terminate prior to the second end thereof.

3. The rotor blade assembly of claim 1, further comprising a bond layer disposed between the first end of the extension and the surface of the rotor blade, the bond layer bonding the first end of the extension to the rotor blade.

4. The rotor blade assembly of claim 3, wherein the bond layer comprises at least one of a weld, an epoxy, a polyurethane, a methacrylate, an acrylic, or an inner acrylic foam layer disposed between opposing outer adhesive layers.

5. The rotor blade assembly of claim 1, wherein the extension is constructed of a least one of a thermoplastic material or a thermoset material.

6. The rotor blade assembly of claim 5, wherein the extension is reinforced with a fiber material, the fiber material comprising at least one of glass fibers, carbon fibers, polymer fibers, ceramic fibers, nanofibers, wood fibers, bamboo fibers, or metal fibers.

7. The rotor blade assembly of claim 1, wherein the extension is formed via at least one of injection molding, three-dimensional (3-D) printing, two-dimensional (2-D) pultrusion, 3-D pultrusion, thermoforming, vacuum forming, pressure forming, bladder forming, automated fiber deposition, automated fiber tape deposition, or vacuum infusion.

8. The rotor blade assembly of claim 1, further comprising a plurality of extensions mounted to the rotor blade.

9. A method for reducing variations in loading of a rotor blade of a wind turbine, the method comprising:

mounting a first end of a flexible extension to a surface of the rotor blade, wherein a second end of the flexible extension remains free, being flexible between the first end and the second end, the flexible extension further comprising a gurney flap extending perpendicularly from the extension plate at the second end; and, passively adjusting, via the flexible extension, a chordwise airfoil shape of the rotor blade in response to a changing angle of attack of the rotor blade during operation of the wind turbine.

10. The method of claim 9, further comprising modifying a flexibility of the flexible extension as a function of at least one of a span location along the rotor blade or an aerodynamic characteristic.

11. A wind turbine, comprising:

a tower extending from a support surface;

a nacelle mounted atop the tower;

a rotor having a rotatable hub with a plurality of rotor blades mounted thereto, each of the plurality of rotor blades having surfaces defining a pressure side, a suction side, a leading edge, and a trailing edge extending between a tip and a root; and, an extension comprising a first end and a second end, the first end being mounted to one of the surfaces of the rotor blade, the second end being free, the extension further comprising a gurney flap extending perpendicularly from the extension at the second end, wherein, during operation of the wind turbine, the extension flexes with a changing angle of attack of the rotor blade so as to tailor an airfoil shape of the rotor blade, thereby reducing variations in blade loading.

12. The wind turbine of claim 11, wherein the extension plate comprises one or more openings configured to increase flexibility thereof.

13. The wind turbine of claim 11, wherein the extension is constructed of a least one of a thermoplastic material or a thermoset material, and wherein the extension is reinforced with a fiber material, the fiber material comprising at least one of glass fibers, carbon fibers, polymer fibers, ceramic fibers, nanofibers, wood fibers, bamboo fibers, or metal fibers.

14. The wind turbine of claim 11, wherein the extension is formed via at least one of injection molding, three-dimensional (3-D) printing, two-dimensional (2-D) pultrusion, 3-D pultrusion, thermoforming, vacuum forming, pressure forming, bladder forming, automated fiber deposition, automated fiber tape deposition, or vacuum infusion.

\* \* \* \* \*